(12) United States Patent
Lee

(10) Patent No.: US 8,899,800 B2
(45) Date of Patent: Dec. 2, 2014

(54) INTELLIGENT LIGHT DEVICE FOR A VEHICLE

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 187 days.

(21) Appl. No.: 13/769,832

(22) Filed: Feb. 19, 2013

(65) Prior Publication Data

US 2014/0233250 A1   Aug. 21, 2014

(51) Int. Cl.
*B60Q 1/00* (2006.01)
*F21V 21/28* (2006.01)
*F21V 21/29* (2006.01)
*B60Q 1/08* (2006.01)

(52) U.S. Cl.
CPC ........................................ *B60Q 1/08* (2013.01)
USPC ........... 362/465; 362/475; 362/473; 362/508; 362/512

(58) Field of Classification Search
CPC ........... H05B 33/0812; H05B 33/0842; H05B 33/0863; H05B 33/0869; H05B 33/0872; H05B 37/0227; H05B 37/0281; H05B 37/02; F41V 7/0008; F41V 23/0457; F41V 15/01; F41V 14/02; B62J 6/02
USPC ........... 362/84, 231, 241, 475, 473, 465, 508, 362/512
See application file for complete search history.

(56) References Cited

U.S. PATENT DOCUMENTS

| 2010/0148674 | A1* | 6/2010 | Braun et al. | 315/149 |
| 2010/0165600 | A1* | 7/2010 | Ku | 362/84 |
| 2010/0309675 | A1* | 12/2010 | Lee | 362/473 |
| 2012/0051071 | A1* | 3/2012 | Okubo et al. | 362/465 |
| 2012/0281422 | A1* | 11/2012 | Lee | 362/475 |

* cited by examiner

*Primary Examiner* — Anh Mai
*Assistant Examiner* — Kevin Quarterman

(57) ABSTRACT

An intelligent light device for a vehicle includes a light body, a light-controlling unit, a light-emitting unit and a condensing lens. The light-controlling unit has a MCU and a PWM. The light-controlling unit is used to sense a first illumination level of a surrounding area of a light projection region. Wherein when the MCU receives a signal of the first illumination level, the MCU generates one command of a difference value between a preset illumination level and the first illumination level; and then, the MCU transmits one command to the PWM; thereafter, the PWM adjusts a second illumination level of the light-emitting unit according to one command from the MCU so as to achieve a third illumination level of the light projection region.

7 Claims, 5 Drawing Sheets

INTELLIGENT LIGHT DEVICE FOR A VEHICLE

BACKGROUND OF THE INVENTION

1. Field of the Invention

The present invention relates to a light device, and more particularly to an intelligent light device for a vehicle which adjusts the illumination level of a light body according to the illumination level of the surrounding environment.

2. Description of Related Art

Cycling has become a trend all over the world since it is energy-saving and zero-pollution. In order to ride the bicycle safely, a light device is usually disposed on the bicycle for illumination and warning purposes.

A conventional light device for a bicycle comprises a circuit and a light-emitting diode (hereinafter referred to as LED). The circuit is connected to the LED. The LED is connected to a cadmium sulfide photoresistor (hereinafter referred to as CDS). The CDS is connected to a switch and has a photosensor which senses the illumination level of the surrounding area thereof. The switch selectively connects or breaks an electrical circuit of the conventional light device for a bicycle according to the vibration level of a bicycle so as to control the illumination of the LED, wherein the switch connects the electrical circuit of the conventional light device for the bicycle when the bicycle is vibrated. Under this arrangement, the illumination of the LED is controlled by the photosensor of the CDS and the switch. Although the conventional light device for a bicycle turns on or off according to the illumination level of the surrounding area, the illumination level of the LED cannot be adjusted to an appropriate illumination level because of the structure of the switch. In addition, the photosensor of the CDS is not able to sense the illumination level within a predefined area.

As a result, the disadvantages of the conventional light device for a bicycle are further detailed as following.

Firstly, the illumination level of the LED cannot be adjusted to the appropriate illumination level corresponding to the surrounding environment. Therefore, the illumination level of the LED might not be enough to illuminate a front area of a bicycle in one case so as to cause a bike accident; in another case, the illumination level of the LED might be excess so as to cause a waste of the power.

Secondly, the conventional light device for a bicycle needs to be equipped with a power source with a high capacitance because the conventional light device for a bicycle sometimes keeps turning on even when the illumination is not necessary. The power source with the high capacitance is either expensive or largely sized and weight. Therefore, the conventional light device for a bicycle is inconvenient and not economic for a user.

Thereby, the present invention has arisen to mitigate and/or obviate the disadvantages of conventional light device for a vehicle.

SUMMARY OF THE INVENTION

The main objective of the present invention is to provide an improved light device for a vehicle.

To achieve the objective, an intelligent light device for a vehicle comprises a light body, a light-controlling unit, a light-emitting unit and a condensing lens, the light body having a reflective cup defined at a front portion thereof, the reflective cup concaved toward one end of the light body, an opening defined at one end of the reflective cup, the condensing lens defined at the opening of the reflective cup, the light-controlling unit defined in the light body, the light-emitting unit defined on an inner wall of the reflective cup and facing toward the condensing lens, a light projection region defined by the light beam which is projected from the light-emitting unit and refracted through the condensing lens, the light-controlling unit facing toward the light projection region, the light-controlling unit having a micro control unit and a pulse width modulation unit, the light-controlling unit used to sense a first illumination level of a surrounding area of the light projection region, the micro control unit having a preset illumination level, the micro control unit used to receive a signal of the first illumination level, the pulse width modulation unit used to adjust a second illumination level of the light-emitting unit. Wherein, the light-controlling unit further has a differential amplifier and an analog-to-digital converter, the differential amplifier is used to sense the first illumination level of the surrounding area of the light projection region, and to amplify and transmit the signal of the first illumination level to the analog-to-digital converter, the analog-to-digital converter is used to convert the signal of the first illumination level from a continuous analog signal to a discrete digital signal and to transmit the signal to the micro control unit, the light-controlling unit further has a buffering unit, the buffering unit has a preset buffering time, wherein when the signal sensed via the light-controlling unit changes within one time interval which is shorter than the preset buffering time of the buffering unit, another command is generated via the micro control unit and the pulse width modulation unit so as to stop the light-emitting unit adjusting the second illumination level, wherein when the first illumination level sensed via the light-controlling unit changes within another time interval which is longer than the preset buffering time of the buffering unit, the buffering unit and the micro control unit integrate the data of another time interval and the first illumination level so as to generate one command; and then, one command is transmitted to the pulse width modulation unit; thereafter, the second illumination of the light-emitting unit is adjusted via the pulse width modulation unit so as to achieve a third illumination level of the light projection region; the light-controlling unit is defined on the reflective cup; the present invention has a light sensitive semiconductor defined thereon; a horizontal distance is defined between the light body and the light projection region, the distance is in a range from five to thirty meters; the light body further has an adjusting unit which is connected to the micro control unit, the adjusting unit is used to adjust the second illumination level of the light-emitting unit so that a user adjusts the second illumination level of the light-emitting unit manually via the adjusting unit.

Under this arrangement, when the micro control unit receives the signal of the first illumination level, the micro control unit first compares the signal with the preset illumination level and generates a difference value between the preset illumination level and the first illumination level; and then, the micro control unit transmits the difference value as one command to the pulse width modulation unit; as a result, the pulse width modulation unit adjusts the second illumination level of the light-emitting unit according to one command from the micro control unit so as to achieve the third illumination level of the light projection region by increasing or decreasing the first illumination level.

Further benefits and advantages of the present invention will become apparent after a careful reading of the detailed description with appropriate reference to the accompanying drawings.

DETAILED DESCRIPTION OF THE INVENTION

Figure 1:
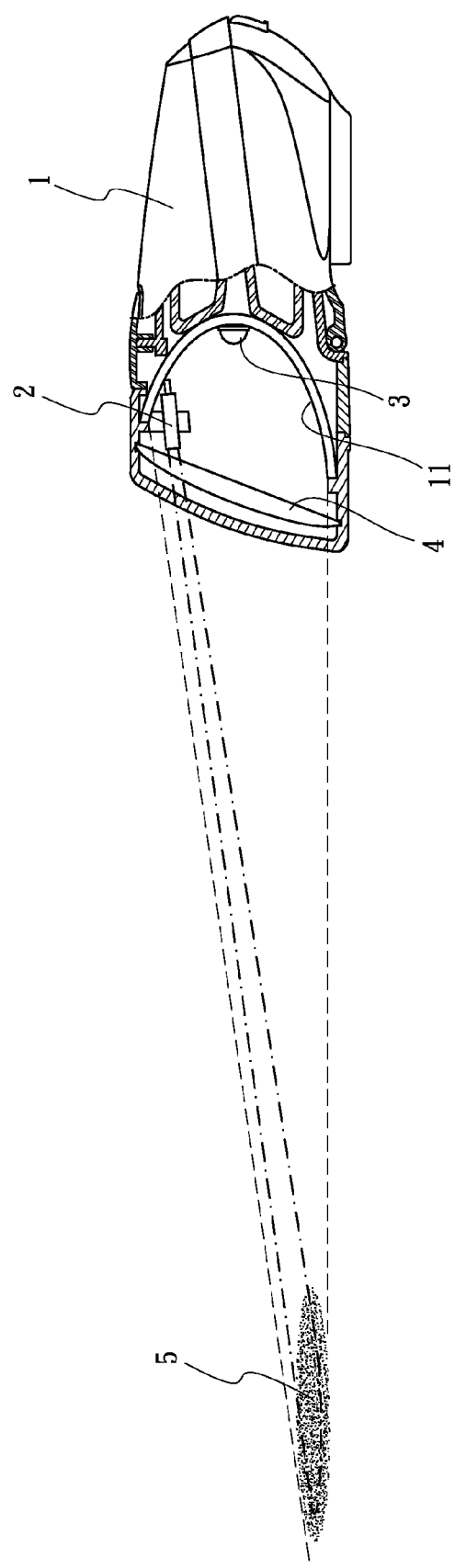
FIG. 1 is a schematic view for showing a light beam projected from an intelligent light device for a vehicle in accordance with the present invention.
Figure 2:
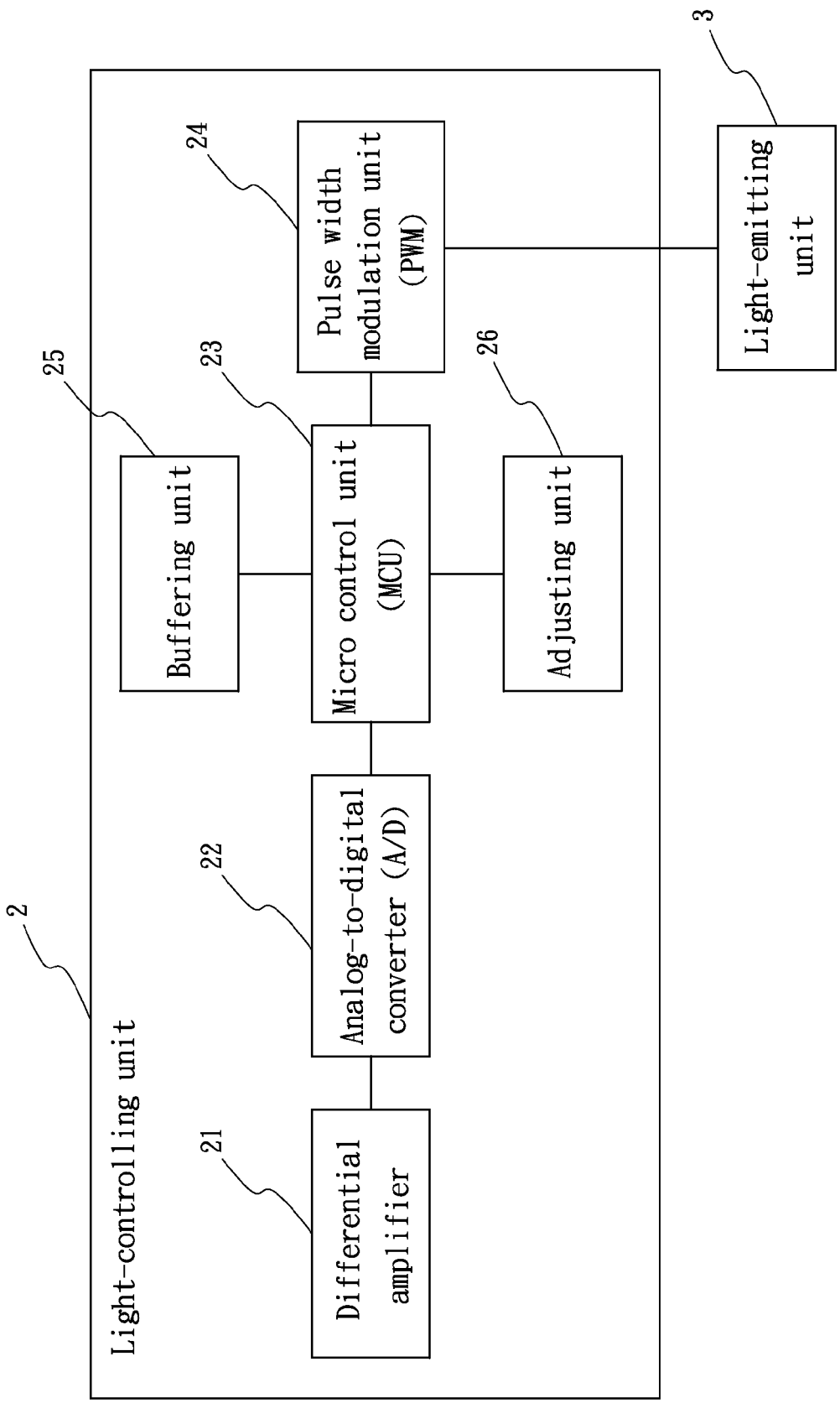
FIG. 2 is a flow chart for showing a light-controlling unit of the present invention.
Figure 3:
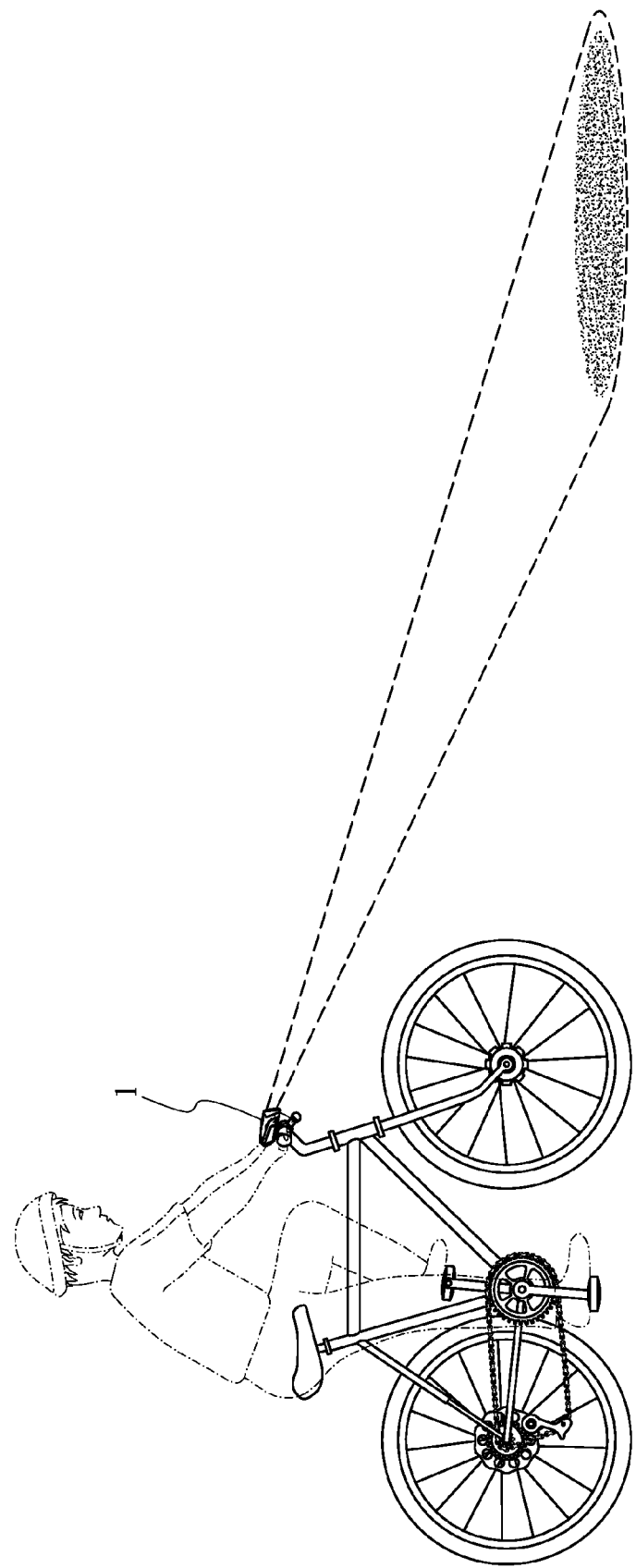
FIG. 3 is a schematic view for showing the present invention is assembled onto a bicycle and lights one light projection region.
Figure 4:
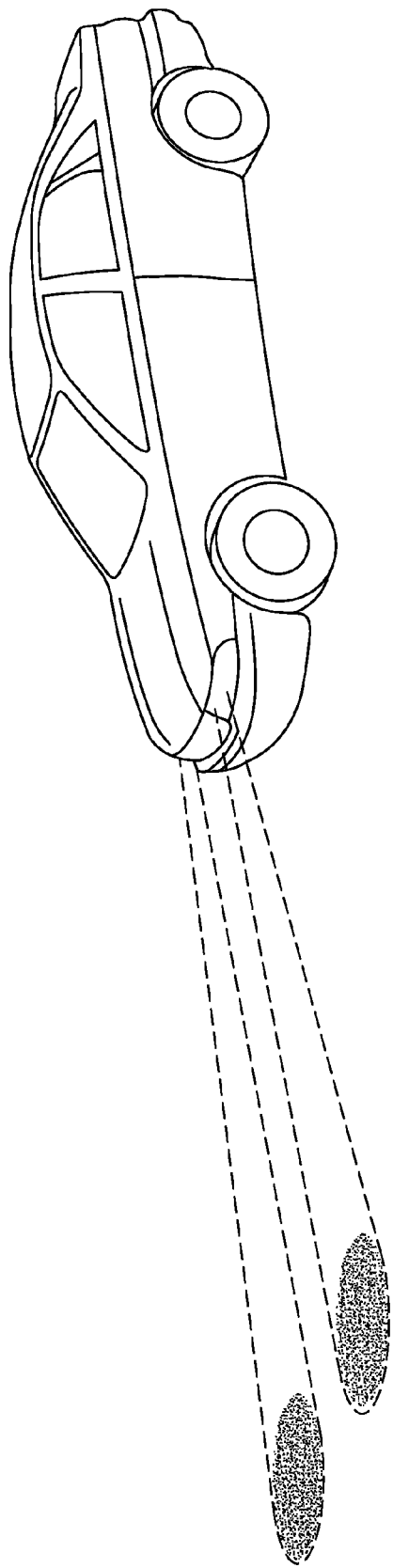
FIG. 4 is a schematic view for showing the present invention is assembled onto a car and lights another light projection region.

Referring to FIGS. 1-2, an intelligent light device for a vehicle comprises a light body 1, a light-controlling unit 2, a light-emitting unit 3 and a condensing lens 4. The light body 1 has a reflective cup 11 defined at a front portion thereof. The reflective cup 11 is concaved toward one end of the light body 1. An opening is defined at one end of the reflective cup 11. The condensing lens 4 is defined at the opening of the reflective cup 11. The light-controlling unit 2 is defined in the light body 1. The light-emitting unit 3 is defined on an inner wall of the reflective cup 11 and faces toward the condensing lens 4. A light projection region 5 is defined by the light beam which is projected from the light-emitting unit 3 and refracted through the condensing lens 4. The light-controlling unit 2 faces toward the light projection region 5. Referring to FIG. 1, the light body 1 is a bicycle light in a preferred embodiment. The light body 1 has a space defined at the front portion thereof so as to receive the reflective cup 11. The light-controlling unit 2 is defined on the reflective cup 11. The condensing lens 4 is disposed at the opening of the reflective cup 11. The light-emitting unit 3 is defined at a center of the inner wall of the reflective cup 11. One portion of the light beam from the light-emitting unit 3 is projected toward a front area of the light body 1 via the condensing lens 4; another portion of the light beam from the light-emitting unit 3 is first reflected to the condensing lens 4 via the reflective cup 11 and then projected toward the front area of the light body 1. The light projection region 5 is defined at the front area of the light body 1 where the light beam from the light-emitting unit 3 projected to. A horizontal distance is defined between the light body 1 and the light projection region 5. (The distance is in a range from five to thirty meters in the present invention. In one embodiment of the present invention referring to FIG. 3, the horizontal distance is in a range from five to ten meters so as to provide a visible region for a rider of a bicycle or a motorcycle and also for a pedestrian to see the coming bicycle or motorcycle; in addition, the horizontal distance corresponds to another horizontal distance of a general light body which is powered by a battery. In another embodiment of the present invention referring to FIG. 4, the horizontal distance is in a range from fifteen to thirty meters so as to provide a visible region for a car driver.). The light-controlling unit 2 is disposed on a top of the inner wall of the reflective cup 11 and faces toward the light projection region 5. The light-controlling unit 2 is moderate-sized, so that a size of the light body 1 does not need to be enlarged to receive the light-controlling unit 2; also, the light-controlling unit 2 does not interfere with the light beam projection of the light-emitting unit 3.

Referring to FIG. 2, the light-controlling unit 2 has a differential amplifier 21, an analog-to-digital converter 22 (hereinafter referred to as A/D 22), a micro control unit 23 (hereinafter referred to as MCU 23) and a pulse width modulation unit 24 (hereinafter referred to as PWM 24). The differential amplifier 21 is used to sense a first illumination level of a surrounding area of the light projection region 5, and also amplify and transmit a signal of the first illumination level to the A/D 22 (the differential amplifier 21 is one of an ordinary skill in the art). The A/D 22 is used to convert the signal of the first illumination level from a continuous analog signal to a discrete digital signal and also to transmit the signal to the MCU 23. The MCU 23 has a preset illumination level. The MCU 23 is used to receive the signal from the A/D 22. When the MCU 23 receives the signal from the A/D 22, the MCU 23 first compares the signal with the preset illumination level and generates a difference value between the preset illumination level and the first illumination level of the surrounding area of the light projection region 5; and then, the MCU 23 transmits the difference value as one command to the PWM 24. The PWM 24 is used to adjust a second illumination level of the light-emitting unit 3 according to one command from the MCU 23. In addition, the differential amplifier 21 and the light-emitting unit 3 constitute a light sensitive semiconductor; therefore, the present invention is able to emit the light, receive the light and amplify the signal of the light. The light-controlling unit 2 further has an adjusting unit 26 which is connected to the MCU 23. The adjusting unit 26 is used to adjust the second illumination level of the light-emitting unit 3. A user can adjust the second illumination level of the light-emitting unit 3 manually via the adjusting unit 26. Therefore, the user can adjust the second illumination level of the light-emitting unit 3 manually according to his or her preference so as to create an appropriate and comfortable illumination level of the light-emitting unit 3.

Under this arrangement, the first illumination level of the surrounding area of the light projection region 5 is sensed via the differential amplifier 21 firstly; and then, the signal of the first illumination level is amplified and transmitted to the A/D 22 via the differential amplifier 21; later, the signal of the first illumination level is transmitted to the MCU 23 via the A/D 22; thereafter, the difference value between the preset illumination level and the first illumination level of the surrounding area of the light projection region 5 is generated and transmitted to the PWM 24 via the MCU 23; lastly, the light-emitting unit 3 is adjusted according to the signal of the difference value from the PWM 24 so as to achieve a third illumination level of the light projection region 5 by increasing or decreasing the first illumination level.

In addition, the light-controlling unit 2 further has a buffering unit 25. The buffering unit 25 has a preset buffering time. When the signal sensed via the light-controlling unit 2 changes within one time interval which is shorter than the preset buffering time of the buffering unit 25, another command is generated via the MCU 23 and the PWM 24 so as to stop the light-emitting unit 3 from adjusting the second illumination level. Therefore, when the first illumination level of the surrounding area of the light projection region 5 is changed temporally, another command generated via the light-controlling unit 2 prevents the light-emitting unit 3 from adjusting the second illumination level, so that the present invention is not flashed occasionally which is caused by the unnecessary adjustment of the light-emitting unit 3. On the contrary, when the first illumination level sensed via the light-controlling unit 2 changes within another time interval which is longer than the preset buffering time of the buffering unit 25, the buffering unit 25 and the MCU 23 integrate the data of another time interval and the first illumination level so as to generate one command; and then, one command is transmitted to the PWM 24; thereafter, the second illumination of the light-emitting unit 3 is adjusted via the PWM 24 so as to achieve the third illumination level of the light projection region 5.

The characteristics of the present invention are described as following.

Firstly, the first illumination level of the surrounding area of the light projection region 5 is sensed via the differential amplifier 21 firstly; and then, the difference value between the preset illumination level and the first illumination level of the surrounding area of the light projection region 5 is generated via the light-controlling unit 2; thereafter, one command is generated according to the difference value; lastly, the light-emitting unit 3 is adjusted according one command so as to achieve the third illumination level of the light projection region 5 by efficiently increasing or decreasing the first illumination level. Therefore, the rider and the pedestrian can see the road conditions clearly and automatically because of the present invention, rather than adjust the light body 1 manually as the prior art; besides, the adjusting mechanism of the present invention is also different from the adjusting mechanism of the prior art which can only turn on and off of the light body 1.

Secondly, since the light body 1 of the present invention is turned up or turned down according to the first illumination level of the surrounding area of the light projection region 5, a compact power source with a compact capacitance is enough for the present invention. Therefore, the present invention has a lighter weight relative to the prior art because of the compact power source. Besides, the compact power source can last longer than the prior art because the prior art can only turn on or off the light body 1, and the light body 1 of the prior art sometimes keeps turning on even when the illumination is not necessary.

Thirdly, the buffering unit 25 ensures the illumination level of the surrounding area of the light projection region 5 to stay in a constant illumination level by giving another command to the light-emitting unit 3, so that the present invention is not flashed which is caused by the unnecessary adjustment of the light-emitting unit 3. Therefore, the present invention illuminates stably and constantly because of the buffering unit 25.

Fourthly, the light body 1 is a car light in the other embodiment of the present invention. When driving in the city or the country, the requirements of the illumination levels are different. In the city, the surrounding environment of a car is bright and does not need to be illuminated a lot in order to see the road conditions; while in the country, the surrounding environment of the car is relatively dark and needs to be illuminated more than in the city. The present invention adjusts the second illumination level of the light-emitting unit 3 according to the surrounding environment of the car; therefore, a driver checks the road conditions clearly and drives safely in both city and country because of the present invention.

Figure 5:
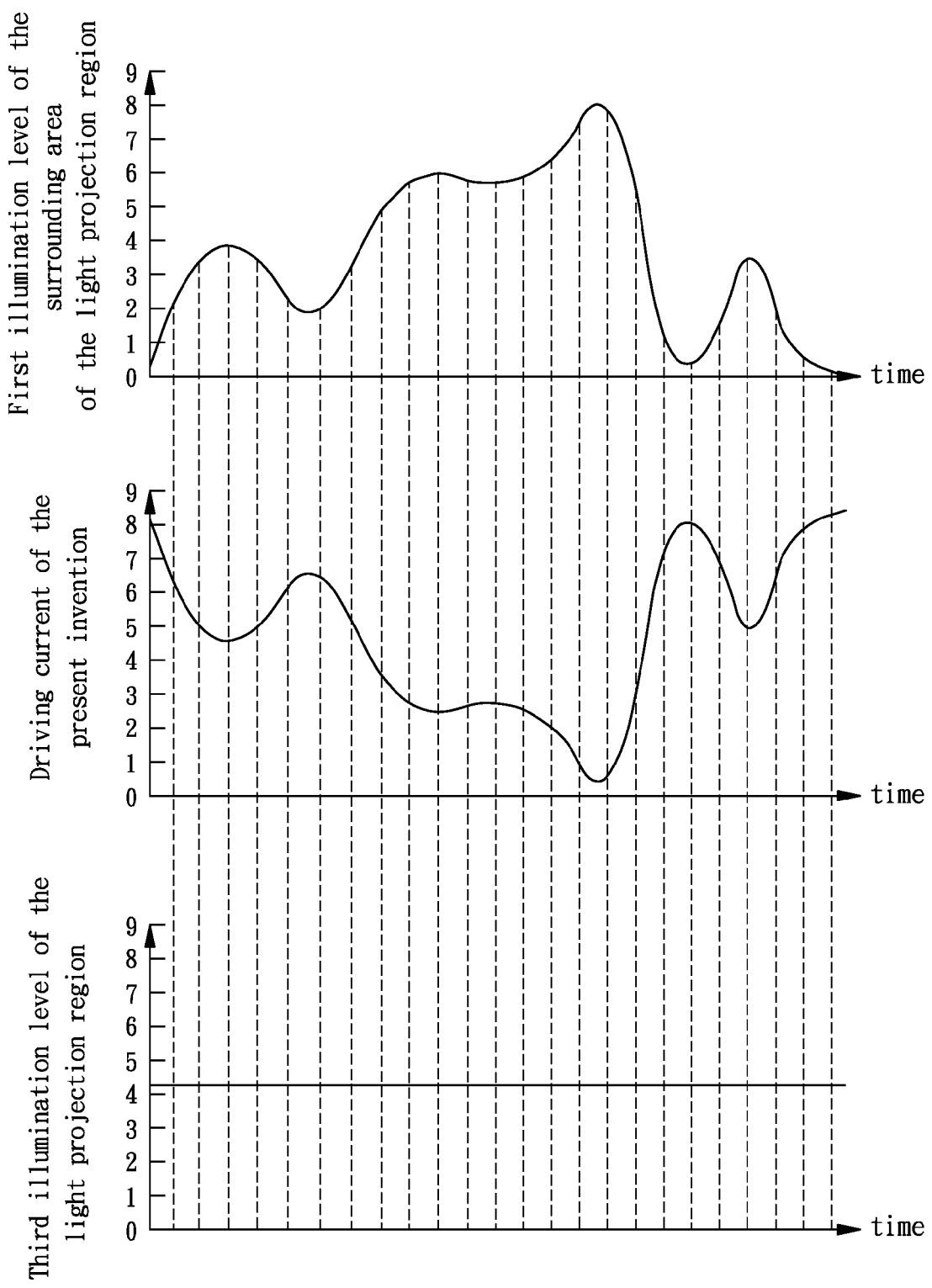
FIG. 5 includes three plots, the top plot shows a first illumination level of a surrounding area of the light projection region is plotted with the corresponding time; the middle plot shows a driving current of the present invention is plotted with the corresponding time; the bottom plot shows a third illumination level of the light projection region is plotted with the corresponding time.

Referring to FIG. 5, the first illumination level of the surrounding area of the light projection region 5 and the corresponding time are plotted as illustrated in the top figure of FIG. 5; the driving current of the present invention and the corresponding time are plotted as illustrated in the middle figure of FIG. 5; the third illumination level of the light projection region 5 and the corresponding time are plotted with as illustrated in the bottom figure of FIG. 5; wherein the driving current is directly proportional to the second illumination level of the light-emitting unit 3. As shown in FIG. 5, when the first illumination level of the surrounding area of the light projection region 5 is low, the second illumination level of the light-emitting unit 3 is increased so as to increase the third illumination level of the light projection region 5, so that the driving current of the present invention is also increased. Therefore, the third illumination level of the projection region 5 stays at the preset illumination level of the MCU 23.

Although the invention has been explained in relation to its preferred embodiment, it is to be understood that many other possible modifications and variations can be made without departing from the spirit and scope of the invention as hereinafter claimed.

What is claimed is:

1. An intelligent light device for a vehicle comprising a light body, a light-controlling unit, a light-emitting unit and a condensing lens;
    the light body having a reflective cup defined at a front portion thereof, the reflective cup concaved toward one end of the light body, an opening defined at one end of the reflective cup, the condensing lens defined at the opening of the reflective cup, the light-controlling unit defined in the light body, the light-emitting unit defined on an inner wall of the reflective cup and facing toward the condensing lens, a light projection region defined by the light beam which is projected from the light-emitting unit and refracted through the condensing lens, the light-controlling unit facing toward the light projection region; and
    the light-controlling unit having a micro control unit and a pulse width modulation unit, the light-controlling unit used to sense a first illumination level of a surrounding area of the light projection region, the micro control unit having a preset illumination level, the micro control unit used to receive a signal of the first illumination level, the pulse width modulation unit used to adjust a second illumination level of the light-emitting unit;
    wherein when the micro control unit receives the signal of the first illumination level, the micro control unit first compares the signal with the preset illumination level and generates a difference value between the preset illumination level and the first illumination level; and then, the micro control unit transmits the difference value as one command to the pulse width modulation unit; as a result, the pulse width modulation unit adjusts the second illumination level of the light-emitting unit according to one command from the micro control unit so as to achieve a third illumination level of the light projection region by increasing or decreasing the first illumination level.

2. The intelligent light device for a vehicle as claimed in claim 1, wherein the light-controlling unit further has a differential amplifier and an analog-to-digital converter; the differential amplifier is used to sense the first illumination level of the surrounding area of the light projection region, and to amplify and transmit the signal of the first illumination level to the analog-to-digital converter; the analog-to-digital converter is used to convert the signal of the first illumination level from a continuous analog signal to a discrete digital signal and to transmit the signal to the micro control unit.

3. The intelligent light device for a vehicle as claimed in claim 1, wherein the light-controlling unit further has a buffering unit; the buffering unit has a preset buffering time; wherein when the signal sensed via the light-controlling unit changes within one time interval which is shorter than the preset buffering time of the buffering unit, another command is generated via the micro control unit and the pulse width modulation unit so as to stop the light-emitting unit adjusting the second illumination level;

wherein when the first illumination level sensed via the light-controlling unit changes within another time interval which is longer than the preset buffering time of the buffering unit, the buffering unit and the micro control unit integrate the data of another time interval and the first illumination level so as to generate one command; and then, one command is transmitted to the pulse width modulation unit; thereafter, the second illumination of the light-emitting unit is adjusted via the pulse width modulation unit so as to achieve the third illumination level of the light projection region.

4. The intelligent light device for a vehicle as claimed in claim 1, wherein the light-controlling unit is defined on the reflective cup.

5. The intelligent light device for a vehicle as claimed in claim 1, wherein the present invention has a light sensitive semiconductor defined thereon.

6. The intelligent light device for a vehicle as claimed in claim 1, wherein a horizontal distance is defined between the light body and the light projection region; the distance is in a range from five to thirty meters.

7. The intelligent light device for a vehicle as claimed in claim 1, wherein the light body further has an adjusting unit which is connected to the micro control unit; the adjusting unit is used to adjust the second illumination level of the light-emitting unit so that a user adjusts the second illumination level of the light-emitting unit manually via the adjusting unit.

* * * * *